Feb. 18, 1958  J. S. OSINSKI  2,823,887
HOSE OR PIPE COUPLING WITH CUT-OFF VALVE
Filed Sept. 29, 1955
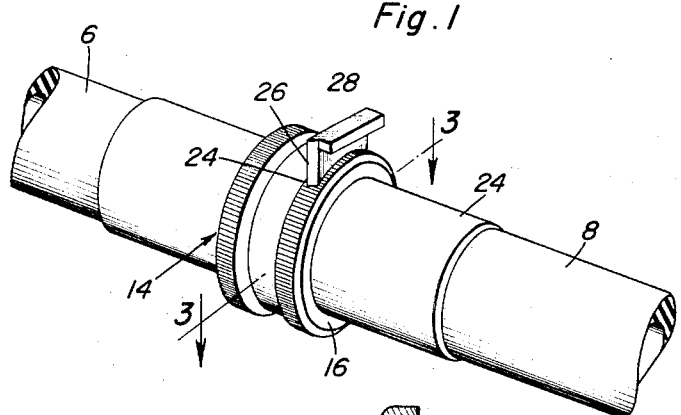
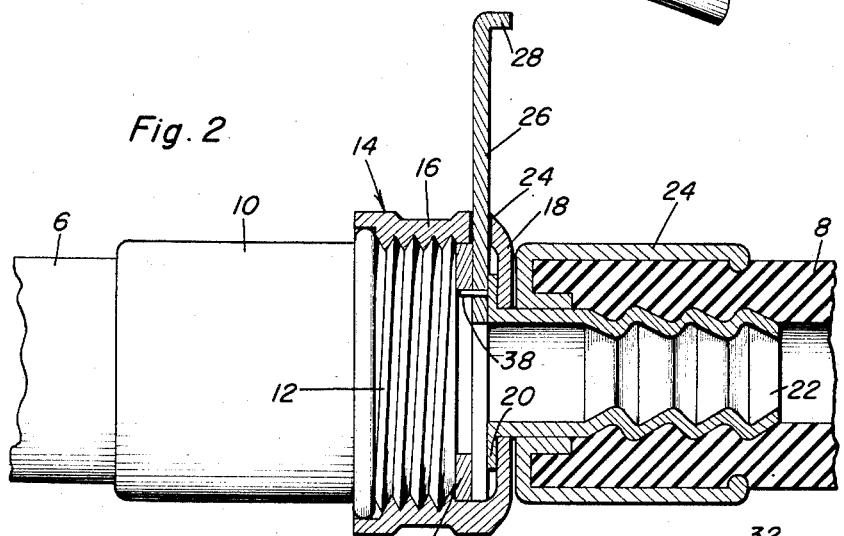
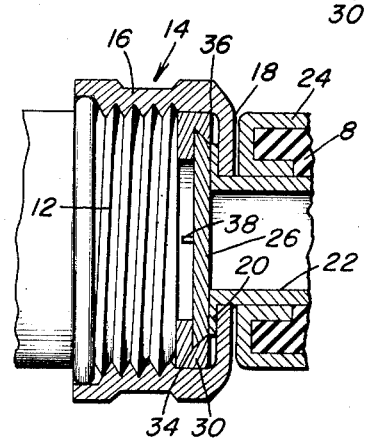
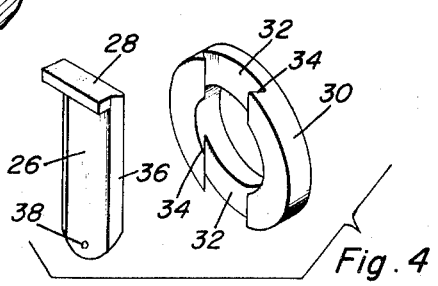
Joseph S. Osinski
INVENTOR.

United States Patent Office 2,823,887
Patented Feb. 18, 1958

2,823,887
HOSE OR PIPE COUPLING WITH CUT-OFF VALVE
Joseph S. Osinski, Cheektowaga, N. Y.
Application September 29, 1955, Serial No. 537,378
1 Claim. (Cl. 251—148)

This invention relates to a garden hose or pipe coupling member which constitutes a highly desirable and worthwhile improvement and advances the art in that it embodies a structurally distinct waterflow cut-off valve.

Manually regulable flow control and cut-off valves in a conventional garden hose or water pipe are, as is generally well known, old in the art herein under consideration. Varied and different attempts and constructions have been offered by others in this line of endeavor. Along the lines of the embodiment of the invention herein involved is a flow controlled valve covered in the William D. Bradshaw Patent 2,674,262 of April 6, 1954. To this end the construction herein revealed has to do with a handy projectible and retractible slide which constitutes a gate valve, whereby to thus provide a simple, practical and economical valve coupling which will fulfill the intended purposes of the improvements herein under advisement.

In carrying out the preferred embodiment of the invention a more or less conventional-type hose or pipe coupling is utilized and, by making a nominal modification therein and installing the slide valve, the desired end results are achieved.

Briefly, the concept is carried into practice in a satisfactory manner through the adoption and use of a garden hose coupling member, for example, the female coupling member which is characterized by a tubular shank having a flanged end and on which the usual internally screw-threaded cup-like member is swively mounted. By providing a grooved gasket and also a slot in the rim portion of the coupling member the construction is then suitable to permit a simple plastic or equivalent plate to be passed through the slot and inserted in the groove and thus employed as a projectible and retractible slide valve.

Other objects, features and advantages will become more readily apparent from the following description and the accompanying sheet of drawings.

In the drawings, wherein like numerals are employed to designate like parts throughout the views:

Figure 1 is a fragmentary perspective view showing hose sections coupled together and wherein the improved cut-off valve is provided;

Figure 2 is a view in section and elevation on an enlarged scale and showing the details with careful particularity;

Figure 3 is a section of the valve closed and which is taken approximately on the plane of the section line 3—3 of Figure 1 looking in the direction of the arrows; and, Figure 4 is an exploded perspective view of the parts constructed in accordance with the principles of the instant invention.

Referring now to the views of the drawings and with reference briefly to Fig. 1, it will be noted that one garden hose section is denoted by the numeral 6 and the other section by the numeral 8. The section 6 is provided on one end with a sleeve-like fitting 10 which is provided with a screw-threaded extension 12 which constitutes a male coupling member. This is adapted to join the usual female coupling member 14 and which, as is usual, comprises a cup-like member characterized by a rim 16 which is internally screw-threaded to accommodate the member 12 and an annular centrally apertured flange 18 swively mounted on the flanged end 20 of the tubular neck or shank 22. The latter is telescoped into the bore of the hose section 8 and is fastened by the customary sleeve member 24.

The principal modification in this otherwise conventional coupling member 14 is the incorporation therein or addition thereto of a suitably sized and positioned slot 24. This is located close to the flange 18 and it is adapted to accommodate the projectible and retractible slide valve 26. This may be of any appropriate material and in practice it has been found that a simple rigid piece or plate of commercial plastics will do. This has a laterally bent end 28 on the outer end portion which provides a finger grip. The cut-off valve action is attained by also providing a ring-like gasket or washer 30. This is like any ordinary insertable and removable rubber or equivalent washer except that it is of greater cross-section and is provided with notches 32 having undercut shoulders 34 into which the beveled edge portions 36 (Fig. 3) are slidably fitted and thus keyed for operation. The numeral 38 designates a suitably positioned stop element or pin which checks the full open position seen in Fig. 2 and also limits the inward sliding action which represents the closed position.

It will be clear that by providing a suitably notched or grooved washer fitting a slide plate therein, operating the slide plate through the slot 24 and providing the lateral bend 28 and check pin 38, a female coupling section or member is thus had which, it is believed, will fulfill the requirements of manufacturers of articles in this line of endeavor and will meet the expectations of garden hose retailers and others and will equally well meet the needs of the average home owner or other user.

The foregoing is considered as illustrative only of the principles of the invention. Further, since numerous modifications and changes will readily occur to those skilled in the art, it its not desired to limit the invention to the exact construction and operation shown and described, and accordingly all suitable modifications and equivalents may be resorted to, falling within the scope of the invention as claimed.

What is claimed as new is as follows:

In combination, a hose coupling member having a tubular shank adapted to telescope retentively into the bore of a hose in a manner to be thus connected to said hose, said shank being flanged at one end, an internally screw-threaded female cup-shaped member swively mounted on the flanged end of said shank and adapted to detachably and accommodatingly receive a cooperating male coupling member, said cup-shaped member having an annular rim provided with a slot, a removable packing ring fitted into said cup-shaped member and provided with diametrically opposite grooves, and an imperforate valve plate slidably mounted in the grooves in said packing ring and also slidably mounted in said slot.

References Cited in the file of this patent
UNITED STATES PATENTS

| | | |
|---|---|---|
| 476,188 | Connor | May 31, 1892 |
| 988,482 | McCune | Apr. 4, 1911 |
| 1,372,987 | Thomas | Mar. 29, 1921 |
| 2,316,981 | Smith | Apr. 20, 1943 |
| 2,674,262 | Bradshaw | Apr. 6, 1954 |

FOREIGN PATENTS

| | | |
|---|---|---|
| 84,332 | Switzerland | Mar. 1, 1920 |